United States Patent [19]

Tardif

[11] Patent Number: 5,661,956
[45] Date of Patent: Sep. 2, 1997

[54] BALE WRAPPING APPARATUS

[76] Inventor: Jean-Roch Tardif, 19 Anseville, Rivière-Du-Loup, Quebec, Canada

[21] Appl. No.: 489,585

[22] Filed: Jun. 12, 1995

[51] Int. Cl.⁶ .................................................. B65B 13/12
[52] U.S. Cl. .................................. 53/588; 53/556
[58] Field of Search ................... 53/556, 588, 210, 53/567, 576, 252

[56] References Cited

U.S. PATENT DOCUMENTS

| | | |
|---|---|---|
| 4,050,220 | 9/1977 | Lancaster et al. . |
| 4,553,374 | 11/1985 | Lancaster et al. . |
| 4,593,518 | 6/1986 | Lancaster et al. . |
| 4,594,836 | 6/1986 | Good . |
| 4,641,484 | 2/1987 | Popelka . |
| 4,686,817 | 8/1987 | Brodecht et al. ................. 53/576 X |
| 4,793,124 | 12/1988 | Anderson . |
| 5,012,631 | 5/1991 | Hostetler et al. . |
| 5,152,125 | 10/1992 | Laver . |
| 5,385,002 | 1/1995 | Cundall ................................ 53/576 X |
| 5,390,476 | 2/1995 | Morantz ................................. 53/556 |
| 5,425,221 | 6/1995 | Pronovost et al. .................. 53/567 |

FOREIGN PATENT DOCUMENTS

| | | | |
|---|---|---|---|
| 2135955 | 9/1984 | United Kingdom ............... 53/576 |
| 93/07059 | 4/1993 | WIPO ................................ 53/588 |

*Primary Examiner*—Linda Johnson
*Attorney, Agent, or Firm*—Marvin S. Towsend

[57] ABSTRACT

A bale wrapping apparatus including a sled with a shallow angle to the horizontal with a trough for receiving bales. A carriage mounted pusher plate driven longitudinally of the trough to push bales through the bale wrapping station, and a delivery apron including an endless belt providing a friction free surface. The sled mounts skis which provide a degree of friction when the sled advances as a reaction of the pressure being placed on the end of the bales by the pusher plate so as to allow compression of the bales.

1 Claim, 5 Drawing Sheets

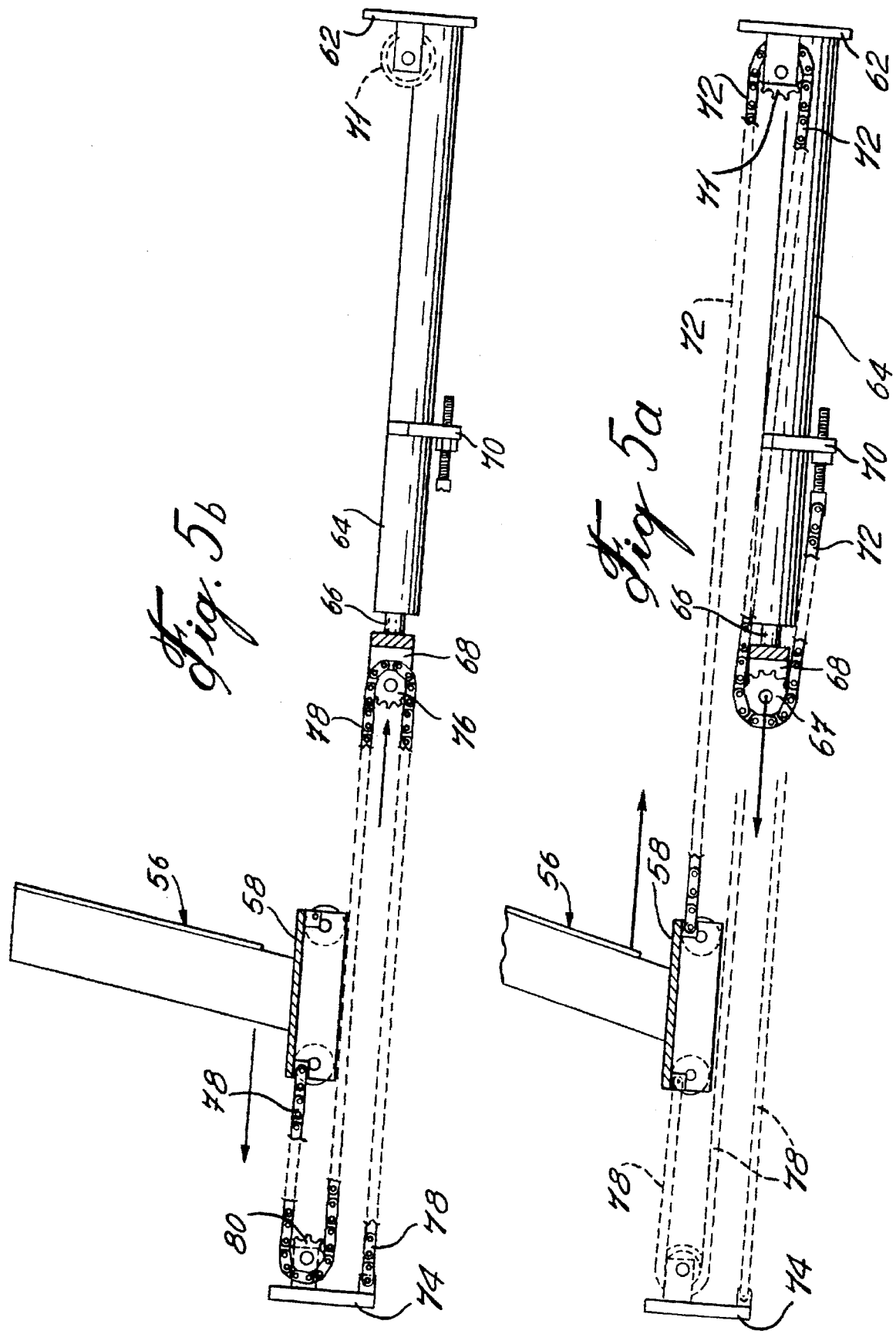

BALE WRAPPING APPARATUS

BACKGROUND OF THE INVENTION

1. Field of the Invention

The present invention related to a bale wrapping apparatus and more particularly to a device for continuously wrapping cylindrical bales of hay or the like in the field.

It has been found, that hay or similar silage can be stored in the field, even throughout the winter months without significantly affecting the condition of the hay or silage or the like. The hay is typically formed into cylindrical modular bales. The bales are individually wrapped as separate packages, and left in the field or suitable storage area. The bales may be wrapped tightly in polyethylene film by means of equipment similar to that used to wrap loose material on pallets. Such a method has found favor with farmers since they do not have to invest in large storage barns. However the success of such a method is mitigated by the considerable amount of handling to wrap each bale.

2. Description of the Prior Art

An improved bale wrapping machine is described in U.S. Pat. No. 4,793,124 issued Dec. 27, 1988 to David Anderson. This apparatus includes a vehicle mounted on wheels having a loading table, a wrapping section and an apron sloping down towards the ground. Individual bales are placed on the loading table and a pusher plate presses on the end of the bale, pushing against a previous bale in series. Part of the so formed length of bales rests on the ground. Thus as the pusher presses on the end of the last bale the vehicle advances as a reaction to the force exerted on the so formed cylinder, due to the frictional resistance of the part of the so formed cylinder on the ground. Since the vehicle is provided with wheels, it offers little resistance to be force produced by the pusher plate. Thus, the vehicle can be seen to advance slowly as the individual bales are loaded on the vehicle while a continuous wrapped cylinder of hay is left on the ground. Significant savings can be realized by such an apparatus which can be operated by a single operator.

The apparatus of U.S. Pat. No. 4,793,124 has certain disadvantages. First because of the slope and length of the vehicle the height of the loading table is not accessible by many small farm loaders. Secondly the vehicle, unless brakes are provided on the wheels, presents little resistance to the force of the pusher plate on the end of the cylinder so that the bales are not sufficiently compressed. It is necessary that the hay be well compressed, when wrapped, so as to minimize the oxygen present within the bales. Thirdly the overall size of the vehicle renders it difficult to use and it is less economical.

SUMMARY OF THE INVENTION

It is an aim of the present invention to provide an improved bale wrapping apparatus compared to the device mentioned above.

In particular, it is an aim of the present invention to provide an apparatus for forming elongated cylinders of hay or the like which provides sufficient resistance to the forward movement of the vehicle to provide the required compression to the bales being wrapped to reduce the air present in the wrapped cylinder so formed.

It is a further aim of the present invention to provide an apparatus, of the type described in U.S. Pat. No. 4,793,124 with a loading table at a height which is accessible to most small farm loaders, thereby eliminating the need to obtain a special loader to be able to use the bale wrapping apparatus.

It is a further aim of the present invention to provide a compact bale wrapping apparatus which is easily stored when not in use, light, and inexpensive relative to the prior art.

An apparatus in accordance with the present invention includes a sled having a loading platform, a wrapping section and a delivery apron on a single frame, wherein the frame includes skis, adapted to support the frame on the ground and permit sliding movement on the ground in a forward direction, the loading platform, wrapping section and delivery apron extending at an angle to the horizontal of at least 3 degrees and not exceeding 6 degrees, the loading platform including a pusher means including a motor driven sliding abutment member, a hoop mounted, film wrapping means in the wrapping section, and a friction free surface on the delivery apron, whereby individual bales of hay or the like can be placed on the loading platform and pushed through the wrapping station onto the delivery apron by the action of the pusher means and when a series of bales has advanced to the ground from the delivery apron the sled will advance forwardly on the skis over the ground as a reaction to the movement of the pusher means.

BRIEF DESCRIPTION OF THE DRAWINGS

Having thus generally described the nature of the invention, reference will now be made to the accompanying drawings, showing by way of illustration, a preferred embodiment thereof, and in which:

FIGS. 5a and 5b are schematic views showing further details of the aspect of the invention illustrated in FIG. 4.

DESCRIPTION OF THE PREFERRED EMBODIMENTS

Figure 1:
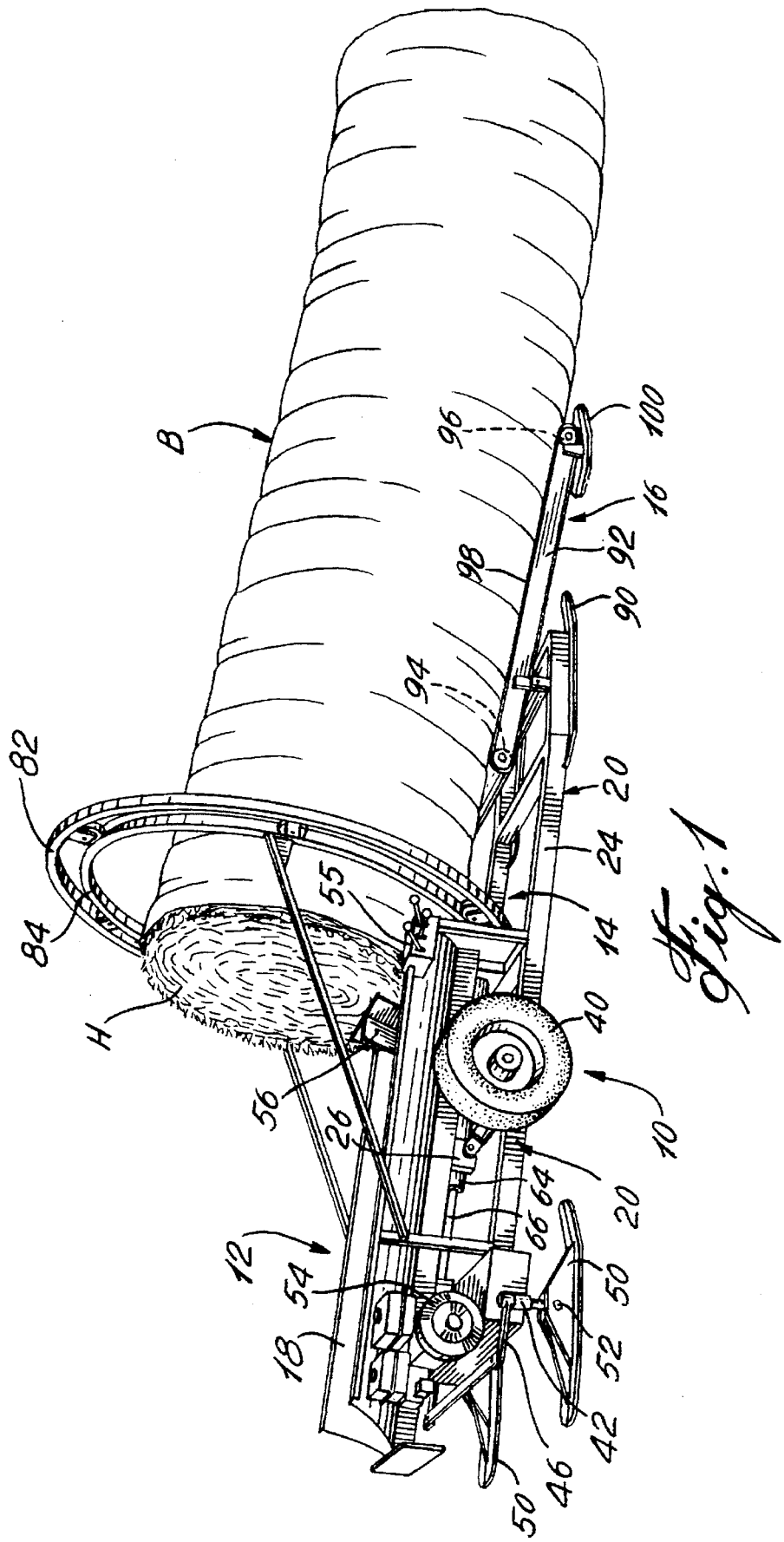
FIG. 1 is a perspective view of a bale wrapping apparatus in accordance with the present invention.
Figure 2:
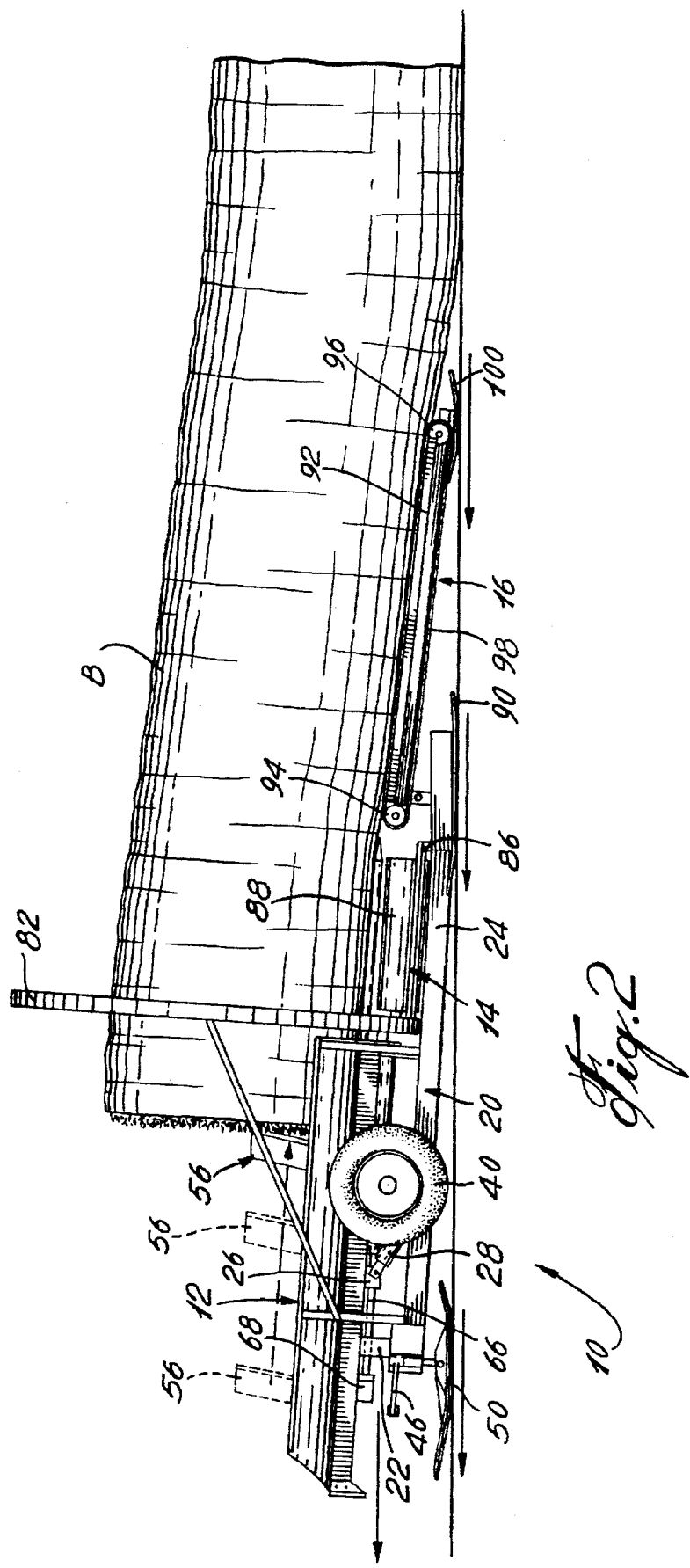
FIG. 2 is a side elevation of the embodiment shown in FIG. 1.

Referring now to FIGS. 1 and 2 the bale wrapping apparatus 10 is illustrated to include a loading platform 12, a wrapping station 14, and a delivery apron 16. The bale apparatus 10 includes a frame 20 which includes an elongated frame member 24 extending at a shallow angle to the horizontal. A mounting trough 18 forms part of the loading platform. The trough 18 is supported on vertical frame members 22.

Figure 3:
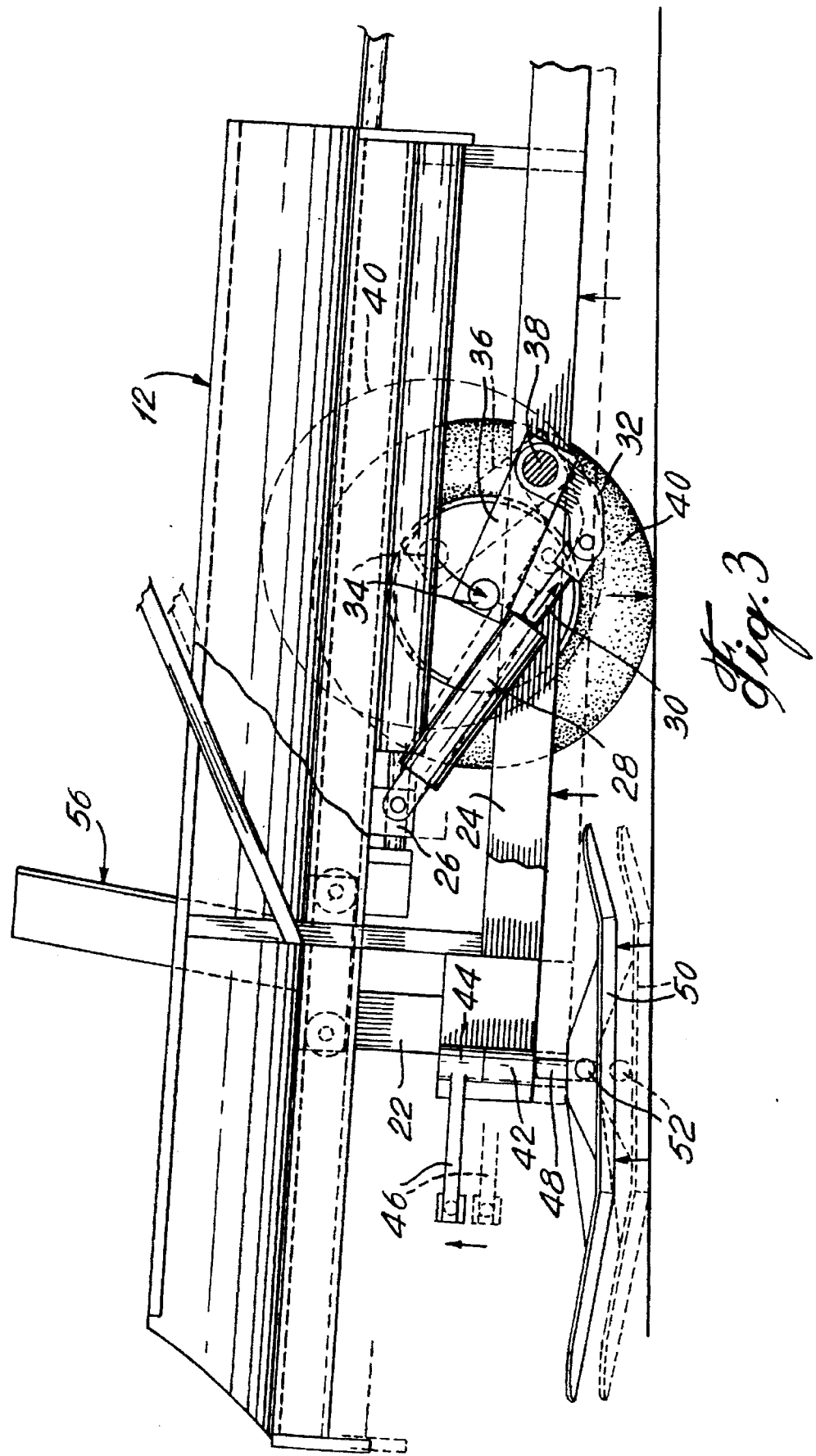
FIG. 3 is an enlarged fragmentary view of a detail of the embodiment shown in FIG. 1.

The bale wrapping apparatus can be trailed to bring it to a particular site. For this purpose a pair of trailing wheels 40 is provided on the frame 20 and includes a bracket 26 as seen in FIG. 3 to which a piston and cylinder arrangement 28, 30 is pivotally mounted. The piston and cylinder arrangement 28, 30 is connected to a dog leg 32 which in turn is fixedly connected to pivot shaft 38. Crank arms 36 are mounted to the pivot shaft 38 and subtend an axle 34 to which wheels 40 are mounted for rotation. Thus, the wheels 40 can be place in a transport position as shown in FIG. 3, in full lines, by activating the piston and cylinder arrangement 28 and 30. During operation, the wheels 40 are retracted as shown in FIGS. 1 and 2, and in dotted lines in FIG. 3.

The bale wrapping apparatus is a sled and includes skis 50. Skis 50 are each pivotally mounted to a shaft 52 which forms part of spindle 48 rotatable in journal bearing 42. A sleeve 44 is fixed to the spindle 48 and can be steered as represented by the steering lever 46.

As shown in FIG. 1, a gasoline engine 54 with an associated oil pump is mounted on the frame on the side of the loading platform 12 and operates the various hydraulics. A operator control station 55 is also located on one side of the loading platform 12, and an operator can control the various hydraulic systems of the bale wrapping apparatus.

The trough 18 includes a semi-circular bed onto which individual bales H can be located by means of a typical farm tractor loader. A pusher plate 56 is provided in the trough 18 and moves longitudinally thereof. The pusher plate 56 is meant to push the bales in a longitudinal direction of the bale wrapping apparatus and through the bale wrapping station 14 against the cylinder B being formed.

Figure 4:
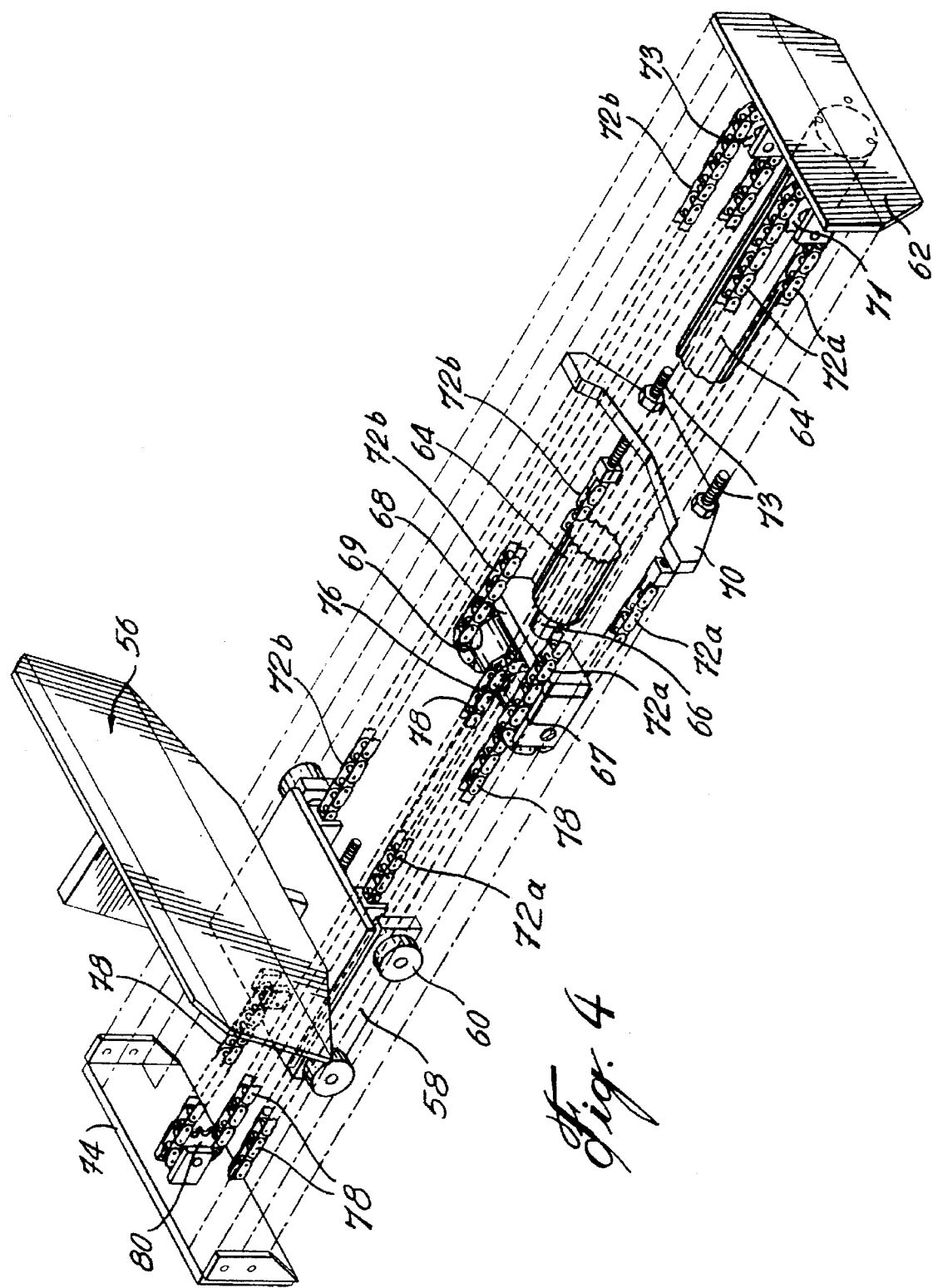
FIG. 4 is a fragmentary perspective view of a further detail of the present invention.

FIGS. 4 and 5a and 5b illustrate the operation of the pusher plate 56. A carriage 58 moves on rails, shown in dotted lines, in FIG. 4. The carriage 58 mounts wheels 60 which move in these rails or tracks in the bottom of the trough 18. A cylinder 64 is fixed at one end to an end plate 62 of the loading platform 12. A piston 66 mounts a bracket 68 which in turn mounts three independent sprockets 67, 69 and 76. Referring to FIGS. 4 and 5a a pair of chains 72a and 72b (identical and which are identified as 72 in FIG. 5a) are fixed at one end to the carriage 58. The other end of the chains 72a and 72b are fixed to a bracket 70 which includes adjustment anchors 73. The chains 72a and 72b pass over sprockets 67 and 69 mounted in the bracket 68, then around sprockets 71 and 73, respectively, on end plate 62, and eventually to the carriage 58.

FIGS. 4 and 5b illustrate the other chain arrangement which is represented by the numeral 78. Chain 78 is fixed at one end to the carriage 58 and at the other end to an end plate 74. Chain 78 extends about the sprocket 76 and bracket 68, around sprocket 80 on end plate 74, and is attached to the carriage 58.

In operation, when it is required to advance the pusher plate 56 against a new bale H, the piston 66 is extended from the cylinder 64, advancing the bracket 68 towards the left in FIGS. 4 and 5a, thereby retracting the chain 72, or at least the upper race thereof. At the same time the upper race of chain 78 is lengthened, and is being pulled by the carriage 58 as the bracket 68 moves towards the left paying out more of chain 78 in the upper race thereof.

When the pusher plate 66 is to be retracted to receive another bale H, the piston 66 is retracted within the cylinder 64 and the chain travel is reversed.

The wrapping station 14 includes a conventional film wrapping apparatus which is partly described in Canadian Patent 1,285,862 Anderson mentioned above. The wrapping station includes an outer hoop 82 and an inner hoop 84. A film holder 86 is illustrated in FIG. 2 and a roll of film 88 is provided on the holder. The holder 86 travels about the cylinder B along the path defined by the hoops 82 and 84 wrapping the film about the bale H being added to the end of cylinder B.

The end of frame member 24 is also provided with skis 90 as shown in FIG. 2.

The delivery apron 16 is mounted to the end of frame 20 and includes a conveyor frame 92 with pulleys 94 and 96 at each end thereof and a conveyor belt 98 extending about the pulleys 94 and 96. The very end of frame 92 is provided with skis 100.

The axis of the path formed by the trough 18 and the delivery apron 16 is at a shallow angle to the horizontal, possibly between 3° and 6°. It is necessary to lay the cylinder B being formed in a gradual manner so as not to tear the wrapping. The optimum angle has been found to be 3.5° from the horizontal. This provides a relatively low trough for receiving bales from a loader while providing the necessary slope. The provision of skis instead of wheels, as in the Anderson's Patent, allows a lower profile.

As described in the Anderson's Patent, the purpose is to utilize the frictional resistance of the weight of the cylinder being formed on the ground to move the bale wrapping apparatus forwardly as a reaction to the pusher plate 56. Unfortunately, with the Anderson's Patent the apparatus includes wheels providing very little resistance to the reaction force, allowing very little compressive forces on the hay forming the bale as the cylinder is being formed. The sled proposed in the present invention, that is mounted on skis, allows a necessary friction to force the pusher plate 56 to compress the bales at the end forming the cylinder B while still advancing the bale wrapping apparatus over the ground.

We claim:

1. A bale wrapping apparatus which includes a frame, a loading platform, a bale wrapping station, and a delivery apron, pusher means provided in the bale loading platform wherein the pusher means includes a pusher plate mounted on a carriage, the carriage slidable longitudinally of the platform in tracks provided on the platform, longitudinally spaced-apart first and second end members provided on the platform, a cylinder mounted to the first end member and including a piston extending therefrom, a bracket mounted to the piston, a first elongated flexible stretch resistant tension member attached at one end to the carriage passing about a wheel mounted to the first end member and around a wheel mounted to the bracket and the other end of the first tension member being anchored to the frame while a second elongated flexible stretch resistant tension member is fixedly connected to the second end member and the second tension member extends about a further wheel on the bracket and about a further wheel on the second end member to be connected to the other end of the carriage for advancing and retracting the carriage as the piston mounting the bracket is extended or retracted.

\* \* \* \* \*